United States Patent [19]

Kawase

[11] Patent Number: 4,589,040
[45] Date of Patent: May 13, 1986

[54] MAGNETIC HEAD POSITION ADJUSTING MECHANISM

[75] Inventor: Hideyuki Kawase, Katsuta, Japan

[73] Assignee: Hitachi, Ltd., Tokyo, Japan

[21] Appl. No.: 476,270

[22] Filed: Mar. 17, 1983

[30] Foreign Application Priority Data

Mar. 19, 1982 [JP] Japan .................................. 57-42713

[51] Int. Cl.$^4$ ............................................... G11B 5/56
[52] U.S. Cl. ........................................ 360/109; 360/76
[58] Field of Search ....................... 360/109, 75–76, 360/104–105, 128–129

[56] References Cited

U.S. PATENT DOCUMENTS

| 4,307,426 | 12/1981 | Aldenhoven | 360/109 |
| 4,422,116 | 12/1983 | Cap | 360/109 |

FOREIGN PATENT DOCUMENTS

| 0119222 | 9/1979 | Japan | 360/109 |
| 0039523 | 4/1980 | Japan . | |
| 0162121 | 10/1982 | Japan | 360/109 |

OTHER PUBLICATIONS

A. B. Habich, "Adjustable Magnetic Head," IBM TDB, May 1968, vol. 10, No. 12, pp. 1906–1907.

*Primary Examiner*—Stuart N. Hecker
*Assistant Examiner*—David J. Severin
*Attorney, Agent, or Firm*—Antonelli, Terry & Wands

[57] ABSTRACT

A magnetic head adjusting mechanism operable to adjust the position of magnetic heads with respect to a direction of a run of magnetic recording medium independently of the adjustments of the head gap angle, the heights of the heads and other adjustment items. The mechanism includes a head base plate carrying the magnetic heads and formed with a shaft bore in which is fitted a support shaft mounted on a chassis. The head base plate is resiliently biased about the axis of the support shaft. The rotation of the head base plate about the support shaft is limited by a tapered adjusting member formed by a tapered nut having a conical outer surface in contact with the head base plate and a screw shaft in threadable engagement with the tapered nut. The screw shaft is mounted on and extends from the chassis to support the tapered nut such that the generating line of the conical surface of the nut, which includes the point of contact of the nut with the head base plate, is substantially parallel to the axis of the support shaft.

10 Claims, 12 Drawing Figures

MAGNETIC HEAD POSITION ADJUSTING MECHANISM

BACKGROUND OF THE INVENTION

The present invention relates to an adjusting device for magnetic heads in a magnetic recording/reproducing apparatus and, more particularly, to an adjusting device for magnetic heads which require an adjustment of position in the direction of running of the magnetic recording medium.

Generally, in a magnetic recording/reproducing apparatus for video signals, a magnetic tape runs from a reel to a rotary head cylinder having a rotary video head via a tape guide pin, eraser head and so forth and, after having been wound around the rotary head cylinder, runs past an audio control head, tape guide pin, capstan and so forth to another reel. For reproducing video or audio signals from a magnetic tape with this tape running system, it is often required to adjust the position of the magnetic head in order that the control head correctly traces the control pulses recorded on the control track on the magnetic tape.

In, for example, Japanese Utility model Laid-Open Publication No. 39523/80 (Application No. 120563/78, filed on Sept. 4, 1978), a device for adjusting the position of the magnetic head is proposed wherein a support and position adjustment for a magnetic head block, usually referred to as "ACE head" in which a magnetic heads for audio signal and control signal and a magnetic head for erasing audio track are constructed as a single unit. In this proposed construction, independent adjustments of not only the position of the magnetic head in the direction of running of the tape but also other adjustment items such as the azimuth angle of the head gap, height of the head, the tilt (inclination) of the head in the back and forth direction and so forth.

While adjustment of an azimuth angle and the adjustment of the position of the head in the tape running direction can be made independently of other items of adjustment. The adjustment of the tilt of the head and the adjustment of the head height, however, affect the azimuth angle and the head position in the tape running position, respectively.

No problem will be caused if predetermined sequences of adjustments are followed, namely, adjustment of the azimuth angle after adjustment of the tilt of the head and adjustment of magnetic head in the tape running direction after the adjustment of magnetic head height. However, with readjustment of a height of the head or readjustment of the tilt of the head, it is necessary to make troublesome readjustment of the head position in the tape running direction or of the azimuth angle even if the head position or the tilt of the head has been correctly adjusted. Without the subsequent readjustment of the head position in the tape running direction or the azimuth angle, problems arise due to incorrect adjustment.

In recent years, there has been a remarkable improvement in the performance which, in turn, affords a higher density in recording on a magnetic tape. Consequently, the tape running speed suitable for the recording or reproduction has been decreased to ½ and then to ⅓ of that required before. The decrease in the tape running speed has imposed a new problem namely, the azimuth angle is now seriously affected by a slight play in the fit between the support shaft and the associated sleeve. For instance, assuming that the track width is 1 mm and the recording frequency is 4 KHz, the level of azimuth loss due to 5' (minutes) deviation of azimuth angle was as small as about −0.4dB when the tape running speed was 33.35 mm. However, when the tape running speed is reduced to 11.12 mm which is about ⅓ (one third), a large azimuth loss of about −4.3dB is caused by the same deviation of the azimuth angle. For instance, the deviation of 5' is caused even by a small inclination of the support shaft caused by a minute clearance of 36 μm between the support shaft and the shaft hole when the axial length of fit between the sleeve and the support shaft is 25 mm. In order to reduce the azimuth loss down to the level of −0.4dB at the low tape speed of 11.12 mm, it is necessary to reduce the clearance between the support shaft and the shaft hole to a level of 12 μm which can hardly be attained by ordinary machining. Clearly, it is quite costly to realize a fit which has small clearance between two members but still ensuring smooth relative sliding motion therebetween.

SUMMARY OF THE INVENTION

Accordingly, an object of the invention is to provide an inexpensive magnetic head adjusting device which does not cause any change in the position of the head in the tape running position when the height of the head is adjusted, thereby to avoiding the above-described problems of the prior art.

Another object of the invention is to provide a magnetic head adjusting device which is improved to eliminate any change in the azimuth angle after adjustment.

To achieve the objects, the present invention provides a magnetic head adjusting device which includes a head base plate carrying magnetic heads and having a shaft bore; a support shaft mounted on the chassis and fitted in the shaft bore in the head base plate; means for applying to the head base plate a force acting to rotate the head base plate about the support shaft; and a tapered adjusting means including a member having a conical outer peripheral surface adapted to contact one end of the head base plate so as to limit the rotation of the head base plate about the support shaft, and a shaft for moving the member up and down. The tapered adjusting means is mounted on the chassis in such a manner that the generating line of the conical outer peripheral surface, which includes the point of contact between the conical outer peripheral surface and the head base plate, extends substantially in parallel with the support shaft.

In one preferred embodiment of the invention, the magnetic head adjusting device further includes adjusting mechanisms carried by the head base plate and adapted for adjusting tilt of the head and the azimuth angle; means for applying to the head base plate a rotational force or moment $\alpha$ for rotating the latter substantially in a plane including the head surfaces contacting the magnetic tape so as to urge the support shaft in the shaft bore to eliminate any mechanical play therebetween, a rotational force or moment $\beta$ for rotating the head base plate about the support shaft, and a thrust force for urging the head base plate in the axial direction of the support shaft; and means for limiting the movement of the head base plate caused by the thrust force in the axial direction of the support shaft.

The above and other objects, features and advantages of the invention will become clear from the following description with reference to the accompanying drawings.

DETAILED DESCRIPTION

Figure 1:
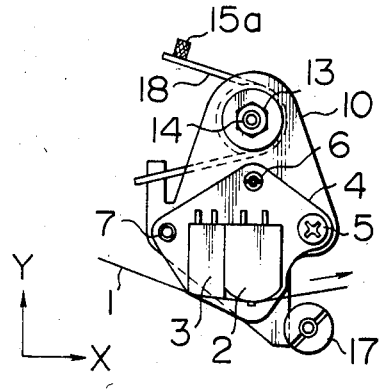
FIG. 1 is a plan view of a conventional magnetic head adjusting device.
Figure 2:
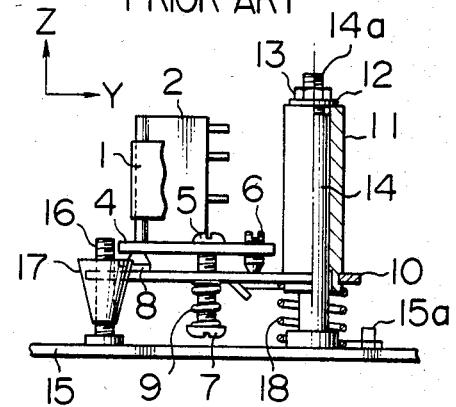
FIG. 2 is a side elevational view of the magnetic head adjusting device shown in FIG. 1.
Figure 3:
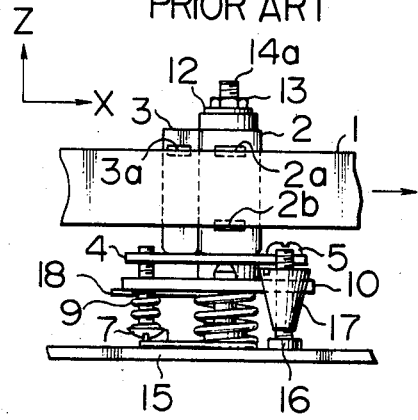
FIG. 3 is a front elevational view of the magnetic head adjusting device shown in FIG. 1.
Figure 4:
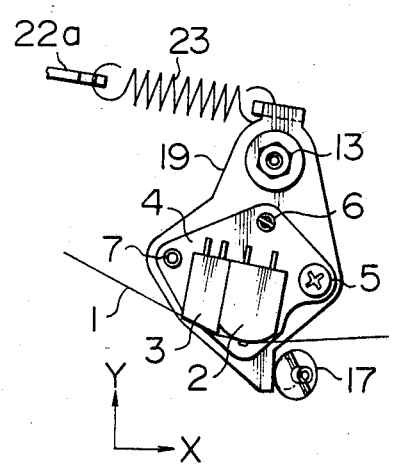
FIG. 4 is a plan view of an embodiment of the magnetic head adjusting device in accordance with the invention.
Figure 5:
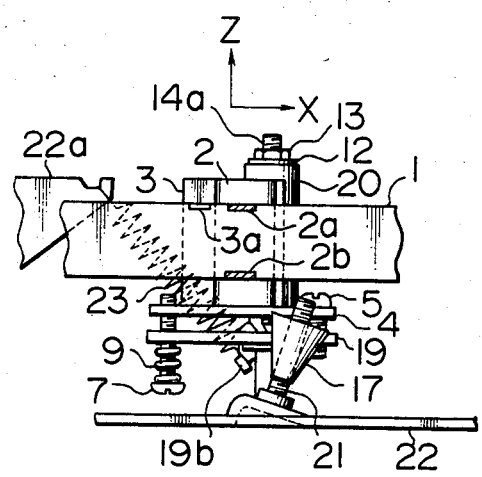
FIG. 5 is a front elevational view of the embodiment shown in FIG. 4.
Figure 6:
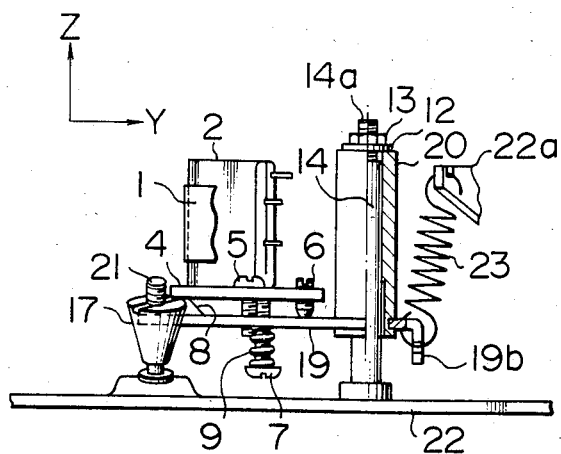
FIG. 6 is a side elevational view of the embodiment shown in FIG. 4.
Figures 7, 8:
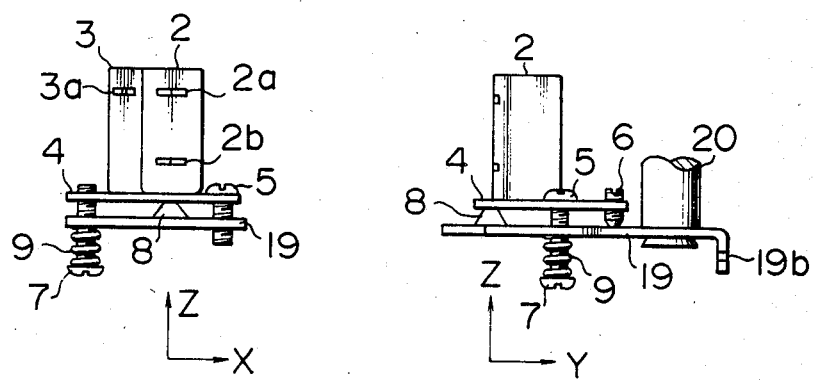
FIG. 7 is a front elevational view of a part of the embodiment shown in FIG. 4.
FIG. 8 is a side elevational view of a part of the embodiment shown in FIG. 4.

Referring now to the drawings wherein like reference numerals are used throughout the various views to designate like parts and, more particularly, to FIGS. 1–3, according to these figures, a device for adjusting the position of a magnetic head of the type proposed in Japanese Utility Model Laid-Open Publication No. 39523/80 includes a head base plate 10 carrying an audio control head 2 and an audio erase head 3 in such a manner that the heads 2, 3 are held in positions for predetermined contact with the magnetic tape 1. The base plate 10 supports mounting members 4–9 which are employed for an adjustment of the azimuth angle and tilt of the head. A sleeve 11 is secured to the head base plate 10 to provide a shaft hole in the head base plate 10. The sleeve 11 together with the torsion spring 18 and washer 12 fits around a support shaft 14 which extends upright from a chassis 15. The torsion spring exerts a resilient force for pushing the head base plate 10 upwardly in an axial direction of the support shaft 14; however, the upward movement of the head base plate 10 is limited by a nut 13 which is screwed to a threaded portion 14a of the head portion of the support shaft 14. Consequently, it is possible to adjust the position of the "ACE" head as a whole in a heightwise direction, that is, in the direction of the arrow Z. The torsion spring 18 also produces a rotational force which acts to bias the "ACE" head counter-clockwise around the axis of the support shaft 14. The rotation of the "ACE" head is limited by a tapered nut 17 screwed to a threaded shaft 16 extending upright from the chassis 15. The rotational reaction force of the torsion spring 18 is received by a stopper 15a on the chassis 15. It is thus possible to adjust the tilt of the head by means of the adjusting screw 6, while the adjustment of the azimuth angle and adjustment of the height of the head are made by the adjusting screw 5 and nut 13, respectively. Additionally, the position of the head in the direction of running of the tape can be adjusted by the tapered nut 17. The members 4, 7, 8, and 9 respectively correspond to a head plate, a screw, a center shaft, and a play eliminating spring.

In accordance with the present invention, as shown in FIGS. 4–9, audio control head 2 has an audio head core 2a and a control head core 2b, with an audio erase head 3 being adapted to erase signals along the audio track on a magnetic tape 1. The audio control head 2 and the audio erase head 3 are carried by a head plate 4 and contact predetermined portions of the magnetic tape 1. The head plate 4 is supported by members such as an azimuth angle adjusting screw 5, a head tilt adjusting screw 6, a screw 7, a play eliminating spring 9 and a center shaft 8 on a head base plate 19. Thus, the head plate 4 is mounted on the head base plate 19 in a manner which permits adjustments of the azimuth angle and the tilt of head. More specifically, the screws 6 and 7 are threadably accommodated into threaded holes in the head plate 4, while the screw 5 is threaded into a threaded hole formed in the head base plate 19. The screw 5 extends through a hole in the head plate 4 and the screw 7 extends through a hole in the head base plate 19. The free end of the screw 6 rests in a recess formed in the head base plate 19, while the center shaft 8 is received at its end by a hole formed in the head plate 4. The play eliminating spring 9 extends around the screw 7 and is loaded between the head of the screw 7 and the head base plate 19 so as to bias the head plate 4 towards the head base plate 19.

When the azimuth angle adjusting screw 5 is rotated, the head plate 4 carrying the heads 2, 3 rocks in a manner within a plane defined by Z and X axes about a line joining the head inclination adjusting screw 6 and the center shaft 8. It is, therefore, possible to vary the azimuth angle by rotating the azimuth angle adjusting screw 5. On the other hand, a rotation of the head tilt adjusting screw 6 causes a rotation of the head plate 4 about a line extending between the azimuth angle adjusting screw 5 and the center shaft 8. Thus, both tilt of the head and the azimuth angle can be simultaneously varied.

A sleeve 20 is fixed to the head base plate 19. A shaft bore formed in the sleeve 20 extends in the direction of Z axis which is substantially parallel to the tape contact surface of the magnetic head and perpendicular to the direction of running of the magnetic tape. The shaft bore of the sleeve 20 snugly receives a support shaft 14 which extends upright from a chassis 22.

A nut 13 together with a washer 12 is threaded onto a threaded end 14a of the support shaft 14 and serves to limit the movement of the sleeve 20 and thus of the heads 2 and 3 and other members on the head base plate 19 in the positive direction along the Z axis. A tension spring 23 is engaged at its one end by a hook 19b on the head base plate 19 and at its other end by a hook 22a on the chassis or a portion of a bracket fixed to the chassis 22 so as to pull the head base plate 19. Thus, the spring 23 produces a force or moment $\beta$ which acts to rotate the head base plate 19 within the X-Y plane about the support shaft 14, a thrust force which acts to slide the head base plate 19 in the direction of Z axis along the support shaft 14, and a force or moment $\alpha$ (indicated by an arrow M in FIG. 9) which acts to rotate the head base plate 19 as a whole substantially within the X-Z plane. A screw shaft 21 is secured to the chassis 22 so as to extend obliquely upwardly at an inclination angle which is same as the gradient of the taper of a tapered nut 17 screwed on to the screw shaft 21. The direction of inclination of the screw shaft 21 is selected such that, assuming that the tapered nut 17 is conical, the generating line of the tapered nut 17 passing through the point of contact between the tapered nut 17 and the base plate 19 extends substantially in parallel with the axis of the support shaft 14. The tapered nut 17 limits the rotation of the head base plate 19 in the X-Y plane.

The heights or levels of the heads 2, 3 are adjustable by the rotation of the nut 13, while the positions of the heads 2, 3 in the tape running direction (direction of X axis) are adjustable by rotating the tapered nut 17.

Figure 10:
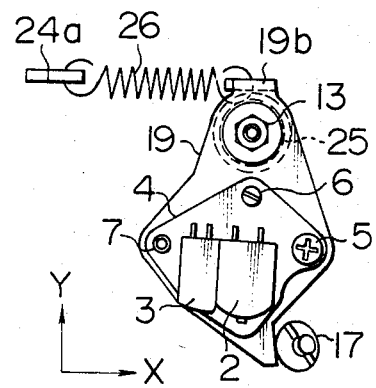
FIG. 10 is a plan view of another embodiment of the magnetic head adjusting device in accordance with the invention.
Figure 11:
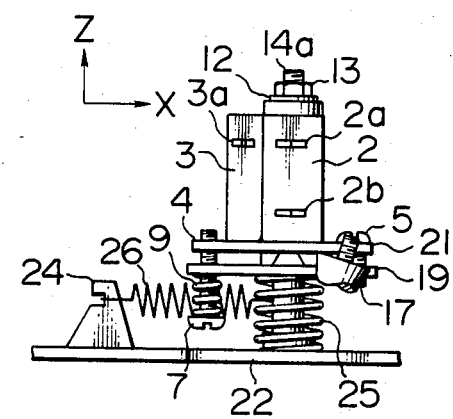
FIG. 11 is a front elevational view of the embodiment shown in FIG. 10.

In the embodiment of FIGS. 10 and 11, the role or function played by the spring 23 in the first embodiment is shared by two springs, namely, a compression spring 25 and a tensile spring 26. The force for moving the head base plate 19 in the direction of Z axis is produced by the compression spring 25, while the tensile spring 26 produces the force or moment $\beta$ for rotating the head base plate 19 in the X-Y plane and the force or moment $\alpha$ for rotating the same in the X-Z plane. The chassis 22 is provided with a hook 24 which is engaged with one end of the tensile spring 26.

Figure 12:
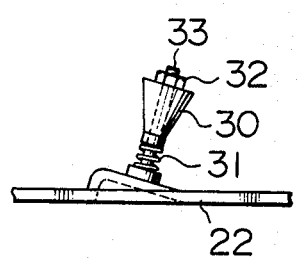
FIG. 12 is a front elevational view of another form of tapered adjusting member incorporated in the device of the invention.

In the embodiments described above, a combination of a tapered nut 17 having a conical outer peripheral surface and a screw shaft 21 threadably engaging with the tapered nut is used as tapered adjusting means. This combination can be substituted by a construction shown in FIG. 12 wherein a tapered member 30 is fastened to a head adjusting shaft 33 by a nut 32 through a spring 31. The arrangement is such that the tapered member 30 moves up and down when the nut 32 is rotated. According to this arrangement, it is not essential that the entire outer peripheral surface has a conical shape. Namely, the member 30 operates satisfactorily provided that the portion of the member 30 contacting one end of the head base plate is inclined to the axis of the member 30.

According to the invention, the adjustment of heights or levels of the heads is achieved by rotating the nut 13 as in the conventional adjusting device. The head adjusting device of the invention, however, is distinguished from the known head adjusting device that, in the head adjusting device of the invention, the locus of movement of the point of contact between the tapered nut 17, limiting the movement of the head block as a whole in the tape running direction and, the head base plate 19 extends substantially in parallel with the direction of height or level adjustment of the head. Therefore, the head base plate 19 does not move substantially in the tape running direction (substantially parallel with the Z axis) even when the head base plate 19 is moved in the direction of the axis Z for height or level adjustment.

In the head adjusting device of the invention, moreover, once the tilt of the head has been adjusted optimumly, the azimuth angle, the head heights or levels, and the head position in the tape running direction can be adjusted independently and in a random sequence by means of the azimuth angle adjusting screw 5, the nut 13 and the tapered nut 17, respectively.

Figure 9:
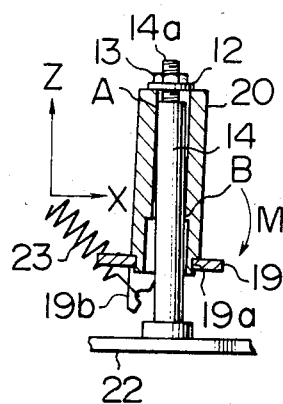
FIG. 9 is a partial sectional view of a part of the embodiment shown in FIG. 4.

The spring 23 or 26 produces a rotational force which biases the support shaft 14 fitted in the shaft bore in the sleeve 20 to cause the support shaft 14 to contact always at two fixed points A and B as shown in FIG. 9 to substantially eliminate any play between the support shaft and the inner surface of the sleeve 20 after the adjustment. Consequently, the deviation of the azimuth angle which inevitably takes place in the known head adjusting device, due to a play between the support shaft and the sleeve, is advantageously avoided. The mechanical plays in other portions are all eliminated by the combination of the play-eliminating spring 9 and the tension spring 23 or by the combination of the play-eliminating spring 9, the compression spring 25 and the tensile spring 26, thereby avoiding any change in other adjusting items. As stated before, in the known head adjusting device, the play between the support shaft 14 and the sleeve 20 could be decreased only by increasing the precision of the machining of the support shaft 14 and the sleeve 20, resulting in an increase in the production cost and the play still could not be perfectly eliminated even by taking such a measure. In contrast, according to the invention, the unfavorable effect produced by the play between the support shaft and the sleeve can be eliminated without requiring any increase in the machining precision and, hence, without incurring substantial increase of the production cost.

As has been described, according to the invention, it is possible to obtain an inexpensive head adjusting device which permits easy adjustments while overcoming the problem, in the conventional head adjusting mechanism, of the undesirable change of the head position in the tape running direction caused by a height or level adjustment. Additionally, the head adjusting device of the invention provides a head stable support which is improved to eliminate changes after adjustment, particularly the change in the azimuth angle which has been a problem in the conventional head adjusting mechanism.

Although the invention has been described through specific terms, it is to be noted here that the described embodiments are not exclusive and various changes and modifications may be imparted thereto without departing from the scope of the invention which is limited solely by the appended claims.

What is claimed is:

1. A magnetic head adjusting device comprising: a head base plate carrying magnetic heads and having a shaft bore; a support shaft mounted on a chassis and fitted in said shaft bore in said head base plate; means for applying a force to said head base plate for rotating said head base plate about said support shaft; and a tapered adjusting means including a member having a conical outer peripheral surface adapted to contact one end of said head base plate so as to limit the rotation of said head base plate about said support shaft, and a shaft along which said member moves up or down; wherein said tapered adjusting means is mounted on said chassis in such a manner that a generating line of said conical outer peripheral surface which includes the point of contact between said conical outer peripheral surface and said head base plate extends substantially in parallel with said support shaft.

2. A magnetic head adjusting device according to claim 1, further including means for applying a rotational force to said head base plate to rotate said head base plate in a plane containing the surfaces of said heads contacting a recording medium, to thereby eliminate mechanical play in the fit between said shaft bore and said support shaft.

3. A magnetic head adjusting device according to claim 2, further including means for imparting a thrust force to said head base plate to urge said head base plate in the direction of the axis of said support shaft; and means for limiting the movement of said head base plate in the axial direction of said support shaft by said thrust force.

4. A magnetic head adjusting device including: a head base plate carrying at least one magnetic head and having a shaft bore substantially parallel with the surface of said magnetic head contacting a magnetic tape and perpendicular to the direction of running of said magnetic tape; a support shaft mounted on a chassis and fitted in said shaft bore in said head base plate; and a first means for applying a force to said head base plate for rotating said head base plate about said support shaft; wherein the improvement comprises adjusting means including an adjusting shaft and a member movable up or down along said adjusting shaft, said member having a portion which contacts one end of said head base plate, said portion being inclined with respect to the axis of said adjusting shaft, said adjusting means being mounted on the chassis such that the locus of the point of contact between said member and said head base plate is substantially in parallel with said support shaft.

5. A magnetic head adjusting device according to claim 4, wherein said member is a conical member having an axis coinciding with the axis of said adjusting shaft.

6. A magnetic head adjusting device according to claim 5, wherein said adjusting shaft is a screw shaft fixed to said chassis and said conical member is a nut threadably engaging with said screw shaft.

7. A magnetic head adjusting device according to claim 4, further including a second means for applying a rotational force to said head base plate for rotating said head base plate in a plane including the point of contact between said magnetic head and said magnetic tape.

8. A magnetic head adjusting device according to claim 7, further including a third means for applying a thrust force to said head base plate for urging said head base plate in the axial direction of said support shaft.

9. A magnetic head adjusting device according to claim 8, wherein a single spring member having an end connected to said head base plate serves as said first, second and third means.

10. A magnetic head adjusting device according to claim 7, wherein a single spring member having an end connected to said head base plate serves as said first and second means.

* * * * *